US012157223B2

(12) United States Patent
Anderson et al.

(10) Patent No.: US 12,157,223 B2
(45) Date of Patent: Dec. 3, 2024

(54) SYSTEMS AND METHODS FOR DISRUPTING RESONANCE IN VACUUM CUP ASSEMBLIES USED WITH PROGRAMMABLE MOTION DEVICES (71) Applicant: Berkshire Grey Operating Company, Inc., Bedford, MA (US)

(72) Inventors: Bretton Anderson, Westford, MA (US); Calvin Toothaker, Medford, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 859 days.

(21) Appl. No.: 17/167,536

(22) Filed: Feb. 4, 2021

(65) Prior Publication Data

US 2021/0237285 A1 Aug. 5, 2021

Related U.S. Application Data (60) Provisional application No. 62/970,208, filed on Feb. 5, 2020.

(51) Int. Cl.
*B25J 15/06* (2006.01)
(52) U.S. Cl.
CPC ................ *B25J 15/0683* (2013.01)
(58) Field of Classification Search
CPC . B25J 15/0683; B25J 15/0616; B66C 1/0231; B66C 1/0293

(Continued)

(56) References Cited

U.S. PATENT DOCUMENTS 1,610,363 A 12/1926 Davis
2,815,919 A 12/1957 Pribil
(Continued)

FOREIGN PATENT DOCUMENTS

CN 1390438 A 1/2003
CN 1744970 A 3/2006
(Continued)

OTHER PUBLICATIONS

Anver Corporation: Vacuum Tube Lifting Systems, Nov. 22, 2004 (http://www.jrgindustries.com/assets/anver.pdf).

(Continued)

*Primary Examiner* — Dean J Kramer
(74) *Attorney, Agent, or Firm* — Gesmer Updegrove LLP (57) ABSTRACT

An end-effector for a programmable motion device is disclosed for use with a vacuum source. The end-effector includes an end-effector attachment portion for attaching the end-effector to the programmable motion device, the end-effector attachment portion including a vacuum channel coupled to the vacuum source, a contact portion of the end-effector for contacting an object to be acquired by the contact portion of the end-effector, a flexible intermediate section including a contact end of the flexible intermediate portion proximate the contact portion of the end-effector, the flexible intermediate section of the end-effector being intermediate the end-effector attachment portion and the contact portion of the end-effector, the flexible intermediate section including a bellows portion that extends radially outwardly of the vacuum channel, and a bellows insert that extends into the flexible intermediate section.

51 Claims, 10 Drawing Sheets (58) Field of Classification Search
USPC .......................................................... 294/183
See application file for complete search history.

(56) References Cited

U.S. PATENT DOCUMENTS

| | | | |
|---|---|---|---|
| 2,853,333 A | 9/1958 | Littell | |
| 3,005,652 A | 10/1961 | Helm | |
| 3,181,563 A | 5/1965 | Giffen | |
| 3,195,941 A | 7/1965 | Morey | |
| 3,656,794 A | 4/1972 | McCord | |
| 3,743,340 A | 7/1973 | Williamann | |
| 3,863,969 A | 2/1975 | Weiss et al. | |
| 4,078,671 A * | 3/1978 | Lundstrom | B25J 15/0616 294/93 |
| 4,389,064 A | 7/1983 | Laverriere | |
| 4,557,659 A | 12/1985 | Scaglia | |
| 4,561,687 A * | 12/1985 | Bostrom | B66C 1/0293 198/689.1 |
| 4,600,229 A | 7/1986 | Oten | |
| 4,717,138 A * | 1/1988 | Watkiss | B66C 1/0231 271/103 |
| 4,787,812 A * | 11/1988 | Gopfert | B66C 23/54 414/737 |
| 4,828,304 A | 5/1989 | No et al. | |
| 5,190,332 A | 3/1993 | Nagai et al. | |
| 5,207,465 A | 5/1993 | Rich | |
| 5,253,858 A | 10/1993 | Grieve | |
| 5,752,729 A | 5/1998 | Crozier et al. | |
| 5,856,487 A | 2/1999 | Gore et al. | |
| 5,865,487 A | 2/1999 | Gore et al. | |
| 5,890,553 A | 4/1999 | Bar-Cohen et al. | |
| 6,131,973 A | 10/2000 | Trudeau et al. | |
| 6,193,291 B1 | 2/2001 | Morroney | |
| 6,213,528 B1 | 4/2001 | Hufken et al. | |
| 6,382,692 B1 | 5/2002 | Schmalz et al. | |
| 6,607,054 B1 | 8/2003 | Linfield | |
| 6,817,639 B2 | 11/2004 | Schmalz et al. | |
| 7,017,961 B1 | 3/2006 | Parnell et al. | |
| 7,618,074 B2 | 11/2009 | Zimmer | |
| 8,070,203 B2 | 12/2011 | Schaumberger | |
| 9,999,977 B2 | 6/2018 | Wagner et al. | |
| 10,118,300 B2 * | 11/2018 | Wagner | B25J 13/085 |
| 10,343,284 B2 | 7/2019 | Wagner et al. | |
| 10,399,236 B2 | 9/2019 | Wagner et al. | |
| 10,576,641 B2 | 3/2020 | Wagner et al. | |
| 10,596,711 B2 | 3/2020 | Wagner et al. | |
| 10,618,177 B2 | 4/2020 | Wagner et al. | |
| 10,639,787 B2 | 5/2020 | Wagner et al. | |
| 10,668,630 B2 | 6/2020 | Robinson et al. | |
| 10,850,402 B2 | 12/2020 | Wagner et al. | |
| 10,857,682 B2 | 12/2020 | Wagner et al. | |
| 10,875,185 B2 | 12/2020 | Wagner et al. | |
| 10,913,159 B2 | 9/2021 | Wagner et al. | |
| 2001/0013434 A1 | 8/2001 | Hopkins | |
| 2001/0045755 A1 | 11/2001 | Schick et al. | |
| 2002/0011735 A1 | 1/2002 | Nagai et al. | |
| 2002/0185575 A1 | 12/2002 | Kalb | |
| 2003/0038491 A1 | 2/2003 | Schmalz et al. | |
| 2006/0242785 A1 | 11/2006 | Cawley et al. | |
| 2007/0006940 A1 | 1/2007 | Perlman et al. | |
| 2010/0150743 A1 | 6/2010 | Dellach | |
| 2011/0255948 A1 | 10/2011 | Malinowski | |
| 2012/0025053 A1 | 2/2012 | Tell | |
| 2013/0129464 A1 | 5/2013 | Regan et al. | |
| 2013/0147101 A1 | 6/2013 | Cho | |
| 2016/0221187 A1 | 8/2016 | Bradski et al. | |
| 2016/0258473 A1 | 9/2016 | Koop et al. | |
| 2016/0271805 A1 | 9/2016 | Kuolt et al. | |
| 2017/0050315 A1 | 2/2017 | Henry et al. | |
| 2017/0057091 A1 | 3/2017 | Wagner et al. | |
| 2017/0062263 A1 | 3/2017 | Kesil et al. | |
| 2017/0072572 A1 | 3/2017 | Wagner et al. | |
| 2017/0080571 A1 | 3/2017 | Wagner et al. | |
| 2017/0080579 A1 | 3/2017 | Wagner et al. | |
| 2017/0087718 A1 | 3/2017 | Wagner et al. | |
| 2017/0120455 A1 | 5/2017 | Wagner et al. |
| 2017/0136632 A1 | 5/2017 | Wagner et al. |
| 2017/0197316 A1 | 7/2017 | Wagner et al. |
| 2017/0225330 A1 | 8/2017 | Wagner et al. |
| 2018/0056333 A1 | 3/2018 | Hicham et al. |
| 2018/0134501 A1 | 5/2018 | Ge et al. |
| 2018/0148272 A1 | 5/2018 | Wagner et al. |
| 2018/0222061 A1 | 8/2018 | Alber |
| 2018/0333749 A1 | 11/2018 | Wagner et al. |
| 2019/0001505 A1 | 1/2019 | Wagner et al. |
| 2019/0039240 A1 | 2/2019 | Wagner et al. |
| 2019/0061174 A1 | 2/2019 | Robinson et al. |
| 2019/0071260 A1 | 3/2019 | Laverdiere |
| 2019/0134827 A1 | 5/2019 | Wagner et al. |
| 2019/0216644 A1 | 7/2019 | Hershoff et al. |
| 2019/0217471 A1 | 7/2019 | Romano et al. |
| 2020/0016746 A1 | 1/2020 | Yap et al. |
| 2020/0017314 A1 | 1/2020 | Rose et al. |
| 2020/0030994 A1 | 1/2020 | Wagner et al. |
| 2020/0130935 A1 | 4/2020 | Wagner et al. |
| 2020/0269416 A1 | 8/2020 | Toothaker et al. |
| 2020/0338728 A1 | 10/2020 | Toothaker et al. |
| 2021/0039268 A1 | 2/2021 | Anderson |
| 2021/0129354 A1 | 5/2021 | Wilson, II et al. |
| 2021/0237285 A1 | 8/2021 | Anderson et al. |
| 2021/0308874 A1 | 10/2021 | Gealy et al. |
| 2021/0308875 A1 | 10/2021 | Gealy et al. |
| 2022/0048717 A1 | 2/2022 | Sullivan et al. |
| 2022/0118629 A1 | 4/2022 | Payton et al. |
| 2023/0091807 A1 | 3/2023 | Anderson |
| 2023/0103821 A1 | 4/2023 | Lovett et al. |

FOREIGN PATENT DOCUMENTS

| | | |
|---|---|---|
| CN | 101925959 A | 12/2010 |
| CN | 203529438 U | 4/2014 |
| CN | 203680306 U | 7/2014 |
| CN | 203717601 U | 7/2014 |
| CN | 105668255 A | 6/2016 |
| CN | 105937541 A | 9/2016 |
| DE | 3324441 A1 | 10/1984 |
| DE | 3810989 A1 | 8/1989 |
| DE | 10121344 A1 | 11/2002 |
| DE | 102011115951 A1 | 4/2013 |
| EP | 2960024 A1 | 12/2015 |
| EP | 3520973 A1 | 8/2019 |
| FR | 2527968 A1 | 12/1983 |
| JP | 2010201536 A | 9/2010 |
| JP | 2018130810 A | 8/2018 |
| JP | 2020089936 A | 6/2020 |
| KR | 20140001186 U * | 2/2014 |
| WO | 2014040843 A1 | 3/2014 |
| WO | 2014161549 A1 | 10/2014 |
| WO | 2015162390 A1 | 10/2015 |
| WO | 2017035466 A1 | 3/2017 |
| WO | 2017044632 A1 | 3/2017 |
| WO | 2017119982 A1 | 7/2017 |
| WO | 2019023729 A1 | 2/2019 |
| WO | 2021026183 A1 | 2/2021 |
| WO | 2021158770 A1 | 8/2021 |

OTHER PUBLICATIONS

Non-Final Office Action issued by the United States Patent and Trademark Office in related U.S. Appl. No. 16/985,295, filed Apr. 29, 2022, 8 pages.

Notice on the First Office Action, along with its English translation, issued by the China National Intellectual Property Administration in related Chinese Patent Application No. 202080053414.4 on Mar. 23, 2023, 32 pages.

Examiner's Report issued by the Innovation, Science and Economic Development Canada (Canadian Intellectual Property Office) in related Canadian Patent Application No. 3,150,291 on Mar. 31, 2023, 4 pages.

Notification Concerning Transmittal of International Preliminary Report on Patentability and the International Preliminary Report on Patentability issued by the International Bureau of WIPO in related (56) References Cited

OTHER PUBLICATIONS

International Application No. PCT/US2021/016582 on Aug. 18, 2022, 8 pages.
Notification Concerning Transmittal of International Preliminary Report on Patentability and the International Preliminary Report on Patentability issued by the International Bureau of WIPO in related International Application No. PCT/US2020/044923 on Feb. 17, 2022, 8 pages.
Communication pursuant to Rules 161(1) and 162 EPC issued by the European Patent Office in related European Patent Application No. 20760997.5 on Mar. 16, 2022, 3 pages.
Notice on the Second Office Action, along with its English translation, issued by the China National Intellectual Property Administration in related Chinese Patent Application No. 202080053414.4 on Aug. 10, 2023, 26 pages.
International Search Report and Written Opinion issued by the International Searching Authority in related International Application No. PCT/US2020/044923 on Nov. 18, 2020, 10 pages.
International Search Report and Written Opinion issued by the International Searching Authority in related International Application No. PCT/US2021/016582 on Jun. 9, 2021, 10 pages.
Communication pursuant to Rules 161(1) and 162 EPC issued by the European Patent Office in related European Patent Application No. 21710646.7 on Sep. 13, 2022, 3 pages.
Communication pursuant to Article 94(3) EPC issued by the European Patent Office in related European Patent Application No. 20760997.5 on Feb. 20, 2024, 6 pages.
Decision on Rejection, along with its English translation, issued by the China National Intellectual Property Administration in related Chinese Patent Application No. 202080053414.4 on Oct. 25, 2023, 22 pages.
Examiner's Report issued by the Innovation, Science and Economic Development Canada (Canadian Intellectual Property Office) in related Canadian Patent Application No. 3,170,700 on Oct. 24, 2023, 4 pages.
Final Office Action issued by the United States Patent and Trademark Office in related U.S. Appl. No. 17/991,073, filed Feb. 13, 2024, 6 pages.
Non-Final Office Action issued by the United States Patent and Trademark Office in related U.S. Appl. No. 17/991,073, filed Sep. 19, 2023, 7 pages.
Examiner's Report issued by the Innovation, Science and Economic Development Canada (Canadian Intellectual Property Office) in related Canadian Patent Application No. 3,170,700 on May 23, 2024, 6 pages.

\* cited by examiner

SYSTEMS AND METHODS FOR DISRUPTING RESONANCE IN VACUUM CUP ASSEMBLIES USED WITH PROGRAMMABLE MOTION DEVICES

PRIORITY

The present application claims priority to U.S. Patent Application No. 62/970,208 filed Feb. 5, 2020, the disclosure of which is hereby incorporated by reference in its entirety.

BACKGROUND

The invention generally relates to programmable motion systems and relates in particular to end-effectors for programmable motion devices (e.g., robotic systems) for use in object processing systems such as object sortation systems.

End-effectors for robotic systems may be employed, for example, in certain applications to select and grasp an object, and then move the acquired object very quickly to a new location. End-effectors should be designed to quickly and easily select and grasp an object from a jumble of dissimilar objects, and should be designed to securely grasp an object during movement. Certain end-effectors, when used on different objects of different physical sizes, weights and materials, may have limitations regarding how securely they may grasp an acquired object, and how securely they may maintain the grasp on the object during rapid movement, particularly rapid acceleration and deceleration (both angular and linear).

Many end-effectors employ vacuum pressure for acquiring and securing objects for transport and/or subsequent operations by articulated arms. Other techniques for acquiring and securing objects involve electrostatic attraction, magnetic attraction, needles for penetrating objects such as fabrics, fingers that squeeze an object, hooks that engage and lift a protruding feature of an object, and collets that expand in an opening of an object, among other techniques.

In applications where vacuum pressure is used to acquire and secure objects, an end-effector on an articulated arm may include a vacuum cup having a compliant portion, e.g., a bellows portion, that contacts the object to be grasped. The compliant portion may be formed of a polymeric or elastomeric material that is flexible enough to allow it to change its shape to adapt to variations in object surface structures, and to varying physical relationships between the articulated arm and the object, such as for example varying angles of approaches to objects. The flexibility further allows the vacuum cup to conform to the shape of objects or to wrap around corners of objects to create an adequate seal for acquiring and securing the object.

When a good seal is not created between a flexible vacuum cup and an object however, or when the air-flow within the end-effector causes very noisy air-flow, sometimes a substantial amount of noise may result, and the noise level may be above safe limits if human personnel are close to the programmable motion device. Other types of end-effectors, however, including vacuum cups with less flexible compliant portions (in addition to those using electrostatic attraction, magnetic attraction, needles for penetrating objects such as fabrics, fingers that squeeze an object, hooks that engage and lift a protruding feature of an object, and collets that expand in an opening of an object), are less effective at acquiring and moving a wide variety of objects.

There remains a need therefore, for an end-effector system in a programmable motion system that may select and grasp any of a wide variety of objects, and then move the acquired objects very quickly to a new location while not producing an unacceptable level of noise.

SUMMARY

In accordance with an aspect, the invention provides an end-effector for a programmable motion device for use with a vacuum source. The end-effector includes: an end-effector attachment portion for attaching the end-effector to the programmable motion device, the end-effector attachment portion including a vacuum channel coupled to the vacuum source, a contact portion of the end-effector for contacting an object to be acquired by the contact portion of the end-effector, a flexible intermediate section including a contact end of the flexible intermediate portion proximate the contact portion of the end-effector, the flexible intermediate section of the end-effector being intermediate the end-effector attachment portion and the contact portion of the end-effector, the flexible intermediate section including a bellows portion that extends radially outwardly of the vacuum channel, and a bellows insert that extends into the flexible intermediate section a sufficient distance to inhibit a substantial amount of air-flow from entering the bellows portion yet does not significantly inhibit freedom of movement of the flexible intermediate section.

In accordance with a further aspect, the invention provides a programmable motion device for use with a vacuum source. The programmable motion device includes an end-effector including: an end-effector attachment portion for attaching the end-effector to the programmable motion device, said end-effector attachment portion including a vacuum channel coupled to the vacuum source, a contact portion of the end-effector for contacting an object to be acquired by the contact portion of the end-effector, a flexible intermediate section including a contact end of the flexible intermediate portion proximate the contact portion of the end-effector, the flexible intermediate portion being intermediate the end-effector attachment portion and the contact portion of the end-effector, the flexible intermediate section including a bellows portion that extends radially outwardly of the vacuum channel, and a bellows insert that extends into the flexible intermediate section, disturbing any resonance of moving air within the bellows portion.

In accordance with a further aspect, the invention provides a method of operating a programmable motion device with a vacuum source. The method includes: providing an end-effector attachment portion for attaching an end-effector to the programmable motion device, said end-effector attachment portion including a vacuum channel coupled to the vacuum source, providing a contact portion of the end-effector for contacting an object to be acquired by the contact portion of the end-effector, providing a flexible intermediate section of the end-effector that is intermediate the end-effector attachment portion and the contact portion of the end-effector, the flexible intermediate section including a bellows portion that extends radially outwardly of the vacuum channel, providing a bellows insert that extends into the flexible intermediate section, and disturbing any resonance of moving air within the bellows portion.

BRIEF DESCRIPTION OF THE DRAWINGS

The following description may be further understood with reference to the accompanying drawings in which.

The drawings are shown for illustrative purposes only.

DETAILED DESCRIPTION

Figure 1:
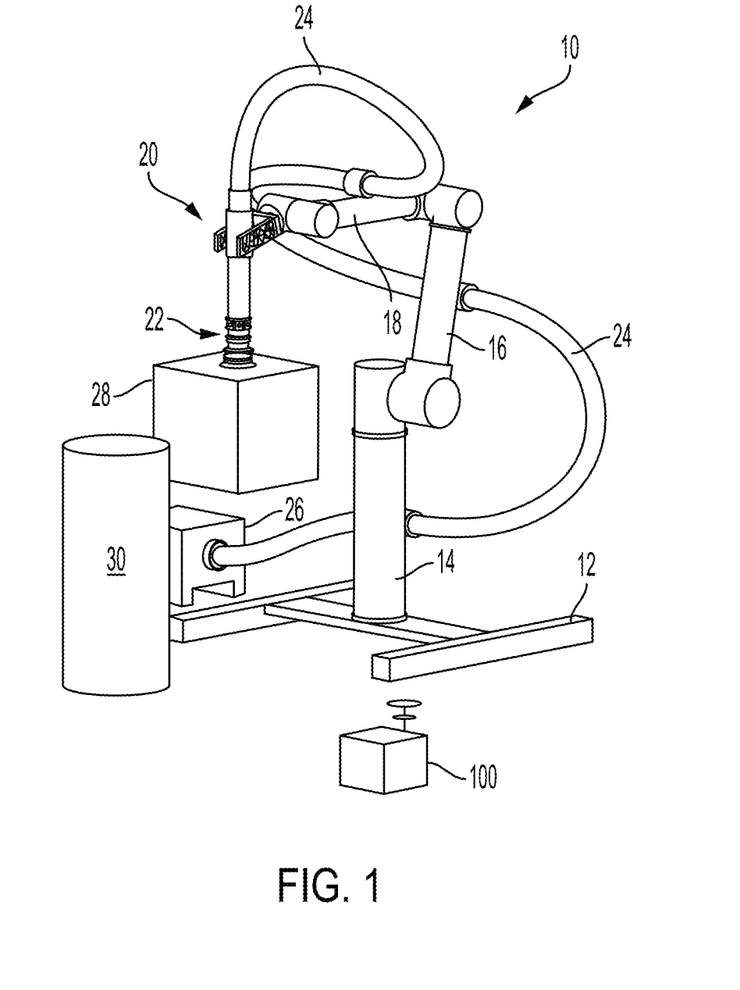
FIG. 1 shows an illustrative diagrammatic view of a programmable motion system with an end-effector in accordance with an aspect of the present invention.

The invention generally relates to vacuum end-effectors on programmable motion devices. FIG. 1 shows a programmable motion device 10 that includes a base 12, a base section 14, and articulated arm sections 16 and 18, as well as a vacuum attachment section 20, and end-effector 22. A high flow vacuum is provided via vacuum hose 24 from a high vacuum source 26. The programmable motion device 10 may be used, under the control of one or more computer processing systems 100, to grasp and move various objects 28, 30 using the high flow vacuum provided at the end-effector 22.

In high air-flow vacuum applications, a vacuum is provided that has a high air-flow, for example, an air-flow of at least about 100 cubic feet per minute, and a vacuum pressure at the end-effector of no more than about 100,000 Pascals below atmospheric, or 85,000 Pascals below atmospheric or 65,000 Pascals below atmospheric. Applicants have discovered that when such a high air-flow vacuum is provided it may cause particularly resonant high air-flow within the end-effector creating a loud (sometimes whistling) noise.

Applicants have further discovered that air moving through a suction cup and in particular, past the bellows cavity produces resonances for certain combinations of air speeds and cavity geometries. It is undesirable to change the vacuum cup assembly when the bellows, cup shape, and collar specifications are selected to work for a desired application. There is a need therefore, to address bellows resonances for certain vacuum cup assemblies and air speeds.

The high flow vacuum may be provided, for example, by a blower, having a vacuum pressure at the end-effector of no more than about 100,000 Pascals below atmospheric, or 85,000 Pascals below atmospheric or 65,000 Pascals below atmospheric (e.g., about 50,000 Pascals below atmospheric or 7.25 psi). A vacuum cup of an end-effector for example, may have an internal vacuum passage dimension (e.g., diameter if round) of about 0.5 inches to about 1.5 inches at a most narrow portion of the vacuum passage at the end-effector. In accordance with various aspects, the components of the end-effector need not be circular in cross-sectional shape, and may be polygonal, including square or triangular.

Figure 2:
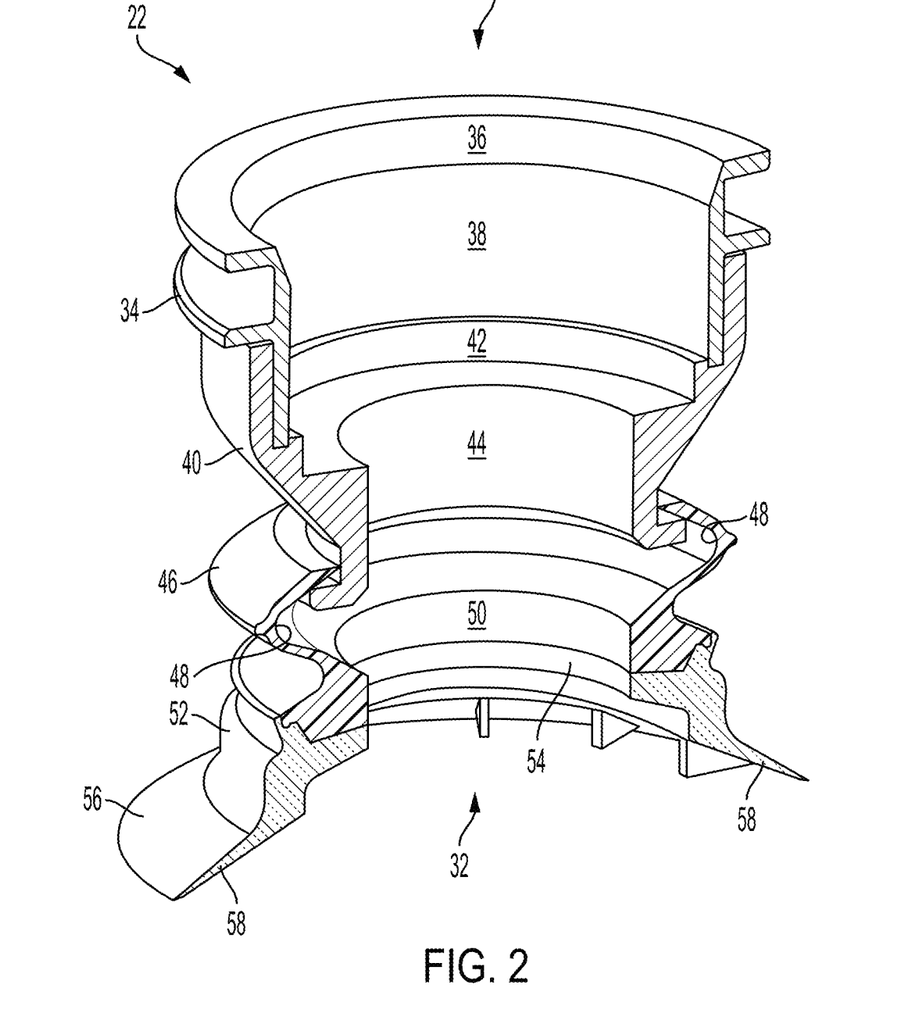
FIG. 2 shows an illustrative diagrammatic partial sectional view of an end-effector that may be used in the system of FIG. 1.

With reference to FIG. 2, it may be seen that the internal vacuum passage 32 includes several components, each with potentially different inner dimensions. In particular, the end-effector 22 includes an attachment portion 34 for attaching to a programmable motion device 10 that includes an angled large inner dimension portion 36 as well as a vertical large inner dimension section 38. A collar 40 is attached to the attachment portion 34, and includes inner dimension sections 42, 44. A flexible bellows 46 that is formed, for example, of compliant elastomeric material has a varying inner dimension portion 48 forming the bellows, and a vertical inner dimension portion 50. A vacuum cup 52 is attached to the bellows, and has a vertical inner dimension portion 54 and an expanding inner dimension that leads to the cup lip 56 which provides the opening at the underside 58 thereof for the end-effector 22.

Figure 3:
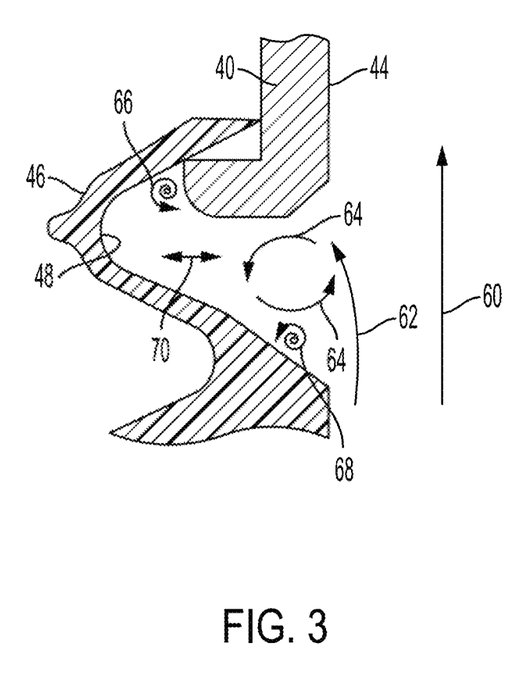
FIG. 3 shows an illustrative diagrammatic sectional view of a portion of the end-effector of FIG. 2.

Applicants have discovered that when the smallest inner dimension portions on either side of the flexible bellows portion (e.g., 44, 50, 54 in the end-effector of FIG. 2) either align or are within plus or minus 10 percent of the size of each other, substantial noise may result when using a high flow vacuum source. FIG. 3 shows a cut-away portion of one side of the internal vacuum passage 32 (shown in FIG. 2), showing portions of the bellows 46 and the collar 40. As the high flow vacuum is drawn (shown diagrammatically at 60), some air travels will split on the trailing edge of the surface 50 and be directed toward the underside of the collar (shown diagrammatically at 62), which air may become entrained in a circular pattern (shown diagrammatically at 64) crossing the fast moving air shown at 62. This may cause additional vortexes (shown diagrammatically at 66 and 68) and may cause an oscillation to occur (shown diagrammatically at 70) within the bellows 46, any or all of which may result in substantial unwanted noise during high flow vacuum use.

Figure 4:
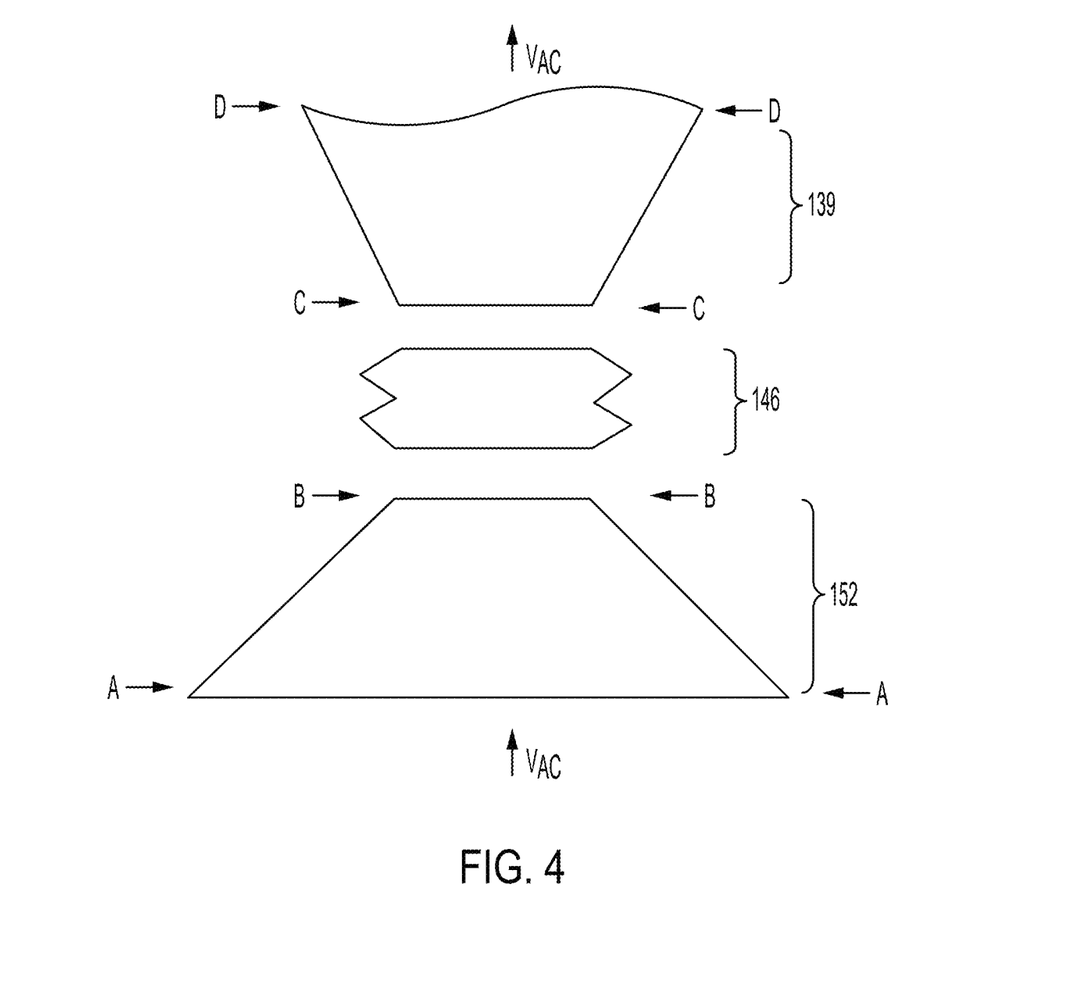
FIG. 4 shows an illustrative diagrammatic side view of relative component parts of the end-effector of FIG. 2.

A fundamental challenge of systems of high flow vacuum systems is that it is desirable to obtain both high volume air-flow at the contact portion of the end-effector, yet permit flexibility of the end-effector as it contacts and grasps objects without significant attendant noise. With reference to FIG. 4, for example, a dimension of the vacuum channel may decrease from the contact portion 152 to a flexible intermediate portion 146 as shown at dimension A decreasing to dimension B in FIG. 4. The smaller dimension B (relative dimension A) facilitates creating the high air-flow vacuum at the contact portion 152. The flexible intermediate portion 146 (e.g., a bellows) provides flexibility in accommodating variations in object contact surfaces and contact experiences that the end-effector may undergo. An attachment portion 139 (e.g., an attachment collar and/or attachment unit) with a smallest internal dimension C increases in inner dimension to D as also shown in FIG. 4. The flexible intermediate portion 146 is positioned between the smaller dimension B of the contact portion 152, and the smaller dimension C of the attachment portion 139.

A narrow inner dimension vacuum channel is maintained at the contact end of the flexible intermediate portion as shown at B in FIG. 4 to provide the high flow vacuum, which widens from dimension A at the contact surface 158 of the contact portion 152 (e.g., vacuum cup). The contact portion may additionally provide some flexibility, but the challenge exists in maintaining the high air-flow vacuum through the flexible intermediate portion without attendant high levels of noise.

In accordance with various aspects, the invention provides a bellows insert that extends into the flexible intermediate section a sufficient distance to inhibit a substantial amount of air-flow from entering the bellows portion yet does not significantly inhibit freedom of movement of the flexible intermediate section. In accordance with further specific aspects, the bellows insert extends into the flexible intermediate section, disturbing any resonance of moving air within the bellows portion. In accordance with further aspects and with reference to FIGS. 9 and 10, the end-effector attachment portion has a smallest internal dimension of $APi_d$, the contact end of the flexible intermediate portion has a smallest internal dimension of $CEi_d$; and the values $AP_{id}$ and $CEi_d$ are within 15% or 10% of each other. In accordance with further aspects, the end-effector system may produce audible noise when the end-effector attachment portion has a smallest internal dimension of $APi_d$, the bellows insert has a smallest internal dimension of $BIi_d$; and the values $AP_{id}$ and $BI_{id}$ are within 15% or 10% of each other. For example, if $BI_{id}$ is within 15% of $AP_{id}$, then bellows inserts in accordance with an aspect of the invention may be used. Surprisingly, the use of designs in accordance with various aspects of the invention reduces the noise generated by a compliant vacuum cup when used in such high air-flow application.

Figure 5:
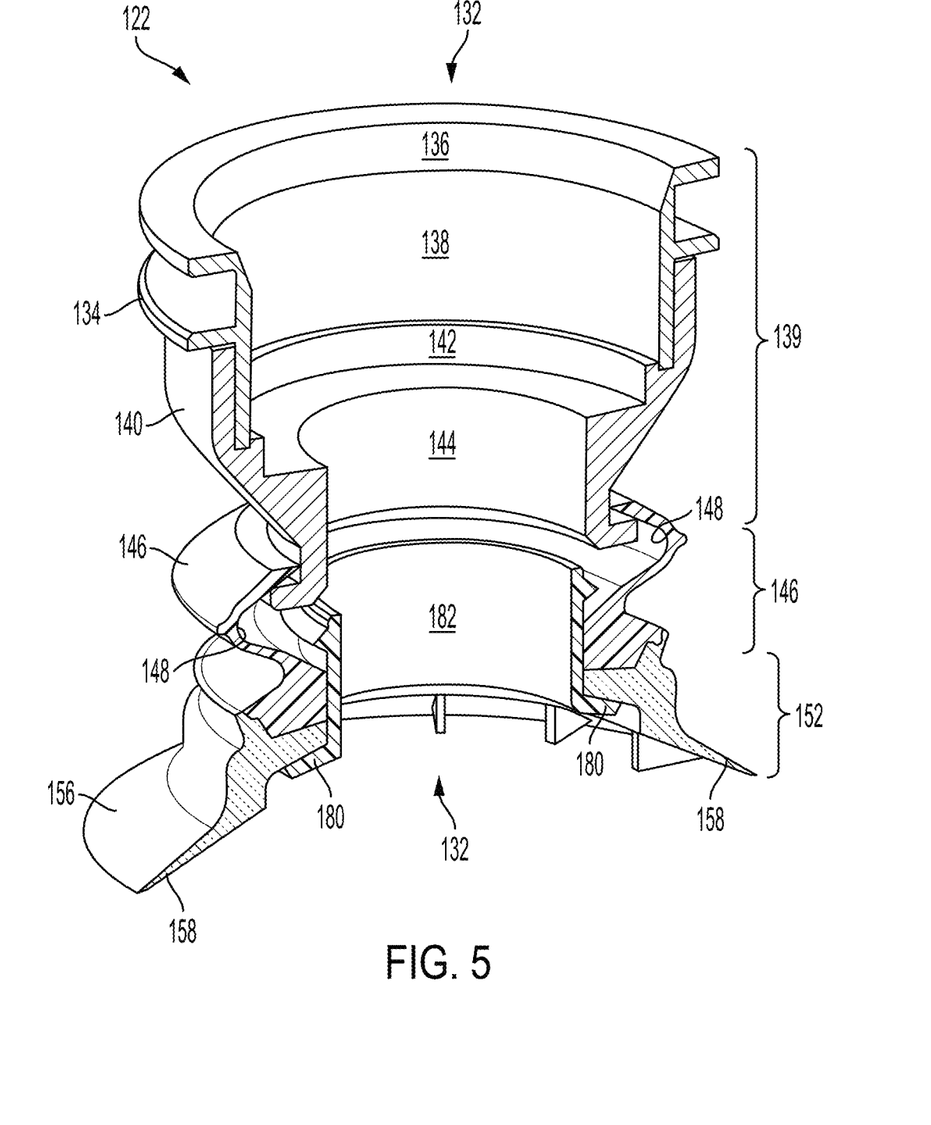
FIG. 5 shows an illustrative diagrammatic partial sectional view of the end-effector used in the system of FIG. 1.

With reference to FIG. 5, the invention provides in accordance with certain aspects, an end-effector 122 as well as the use of the end-effector 122 in the system including the programmable motion device 10 of FIG. 1 in place of the end-effector 22. The end-effector 122 provides a vacuum channel 132 that is provided, in part, by attachment unit 134 having inner dimension portions 136 and 138, collar 146 having inner dimension portions 142 and 144, bellows 146 having varying inner dimension portions 148, and vacuum cup 156. The end-effector 122 further includes a bellows insert 180 having an inner dimension 182. The presence of the bellows may not significantly inhibit movement (e.g., restrict a change in shape of at least 10%, 20%, 50% or 75%) of the flexible bellows in accordance with various aspects of the invention.

Figure 6:
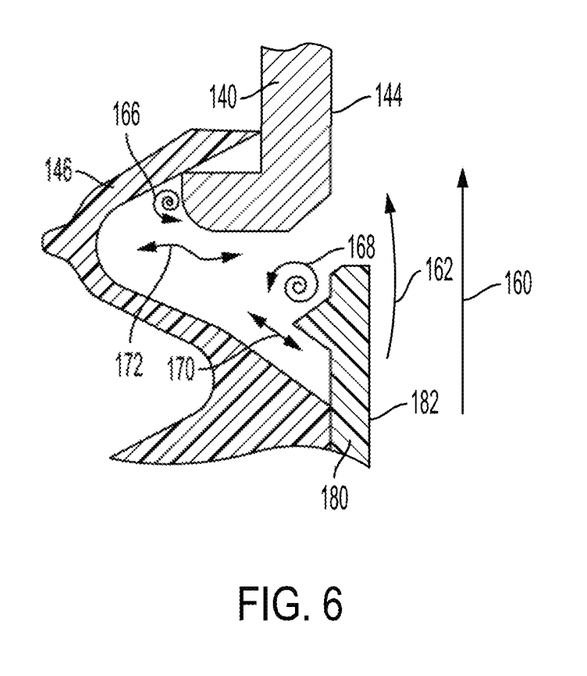
FIG. 6 shows an illustrative diagrammatic partial side view of relative component parts of the end-effector of FIG. 5.

With reference to FIG. 6, as the high air-flow vacuum is drawn (shown diagrammatically at 160), very little air may be directed toward the underside of the collar 140. While some air within the bellows may develop small vortexes (shown diagrammatically at 166, 168), and some air may develop small oscillations (shown diagrammatically at 170), any movement of air may generally be non-uniform (shown diagrammatically at 172). Most significantly, the rate of movement of air within the bellows may be greatly reduced, and large oscillations of air may be reduced or eliminated, resulting in a substantial decrease in unwanted noise during high flow vacuum use with the programmable motion device 10 of FIG. 1 where the end-effector 122 is substituted for the end-effector 22.

Figure 7:
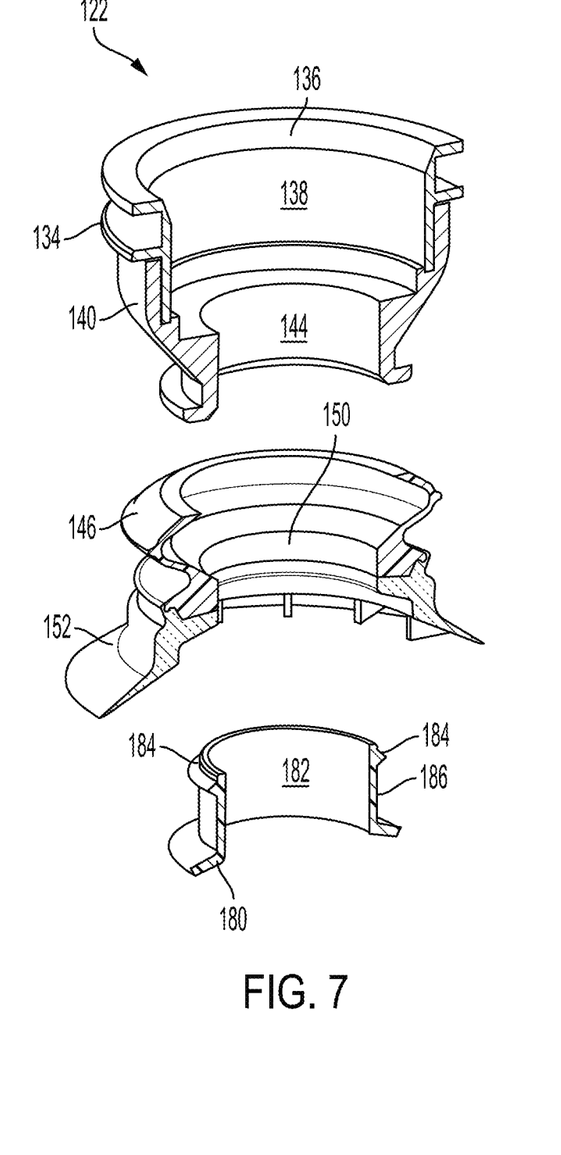
FIG. 7 shows an illustrative diagrammatic partial sectional exploded view of the end-effector of FIG. 5.
Figure 8:
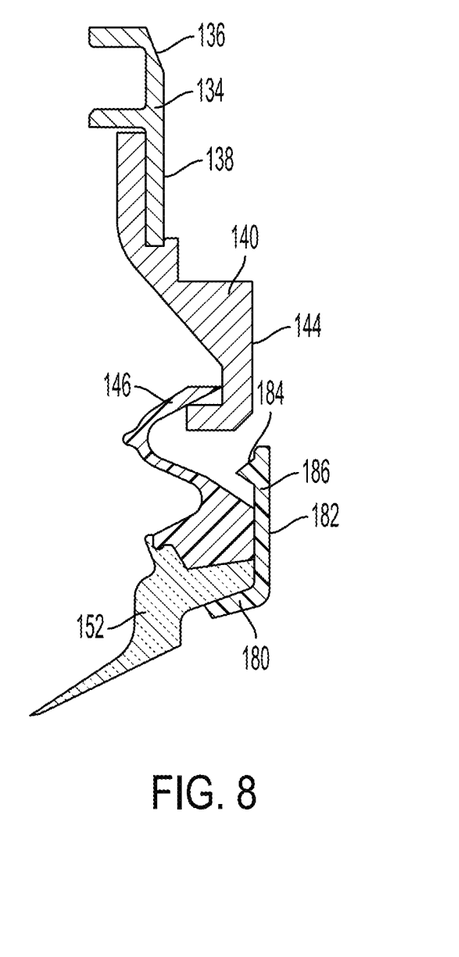
FIG. 8 shows an illustrative diagrammatic partial side view of relative component parts of the end-effector of FIG. 5 showing the attachment unit.

FIG. 7 shows an exploded view of the combined attachment unit 134 and collar 140, the flexible intermediate portion 146 including the vacuum cup 152, and the bellows insert 180. With further reference to FIG. 8, the inner dimension portion 144 of the collar 140, and the inner dimension portion 150 of the flexible intermediate portion 146 may be aligned or closely aligned. Applicants have discovered that in such arrangement, under certain conditions of high flow vacuum use, substantial unwanted noise may result absent a bellows insert 180. As shown in FIGS. 7 and 8, the bellows insert 180 includes a head portion on a protruding end of the bellows insert that extends into the bellows on a bellows insert extension 186, yet does not negatively affect substantial movement of the flexible intermediate portion 146.

Figure 9:
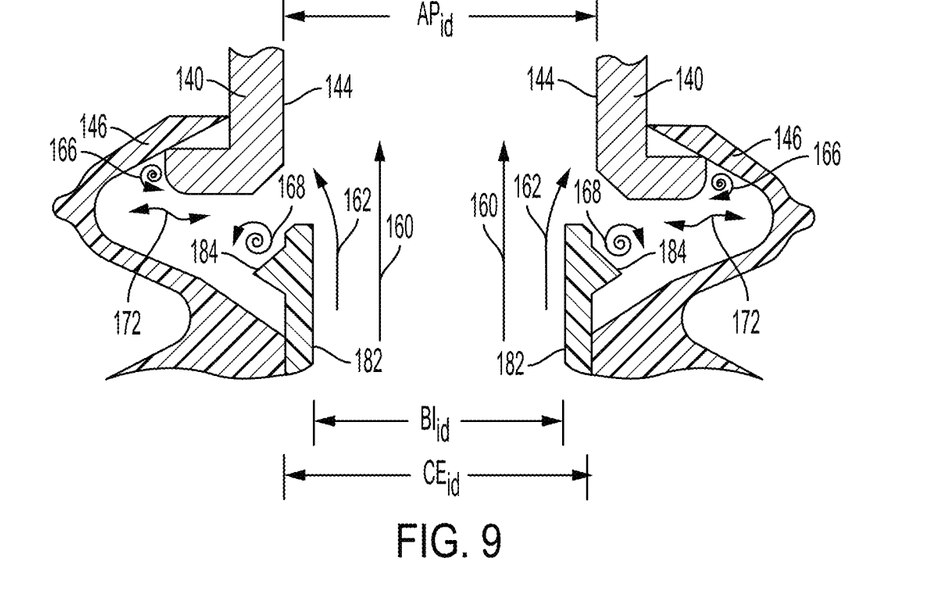
FIG. 9 shows an illustrative diagrammatic center-sectional view of the end-effector of FIG. 5.

With reference to FIG. 9, which shows both sides of the attachment collar 140 (that extends from the attachment unit 134 of FIGS. 5, 7 and 8) and the flexible intermediate portion 146, including the vacuum cup 152, and the bellows insert 180. With reference again to FIG. 8, the inner dimension portion 144 of the collar 140, and the inner dimension portion 150 of the flexible intermediate portion 146 may be aligned or closely aligned. By use of the bellows insert 180, very little air will split on the trailing edge of the inner surface 182 of the bellows insert 180 and be directed toward the underside of the attachment collar 140. While some air within the bellows may develop small vortexes (shown diagrammatically at 166, 168), any movement of air will generally be non-uniform (shown diagrammatically at 172). Most significantly, the rate of movement of air within the bellows will be greatly reduced, and large oscillations of air will be reduced or eliminated, resulting in a substantial decrease in unwanted noise during high flow vacuum use as discussed above. The protrusion 184 (or securement feature) may be provided to facilitate holding the bellow inset in place.

As further shown in FIG. 9, the attachment portion (e.g., collar 144) will have a smallest internal dimension ($AP_{id}$), the contact end of the flexible intermediate portion will have a smallest internal dimension ($CEi_d$), and the bellows insert will have a smallest internal dimension ($BI_{id}$) as shown. The smallest internal dimension of the attachment portion ($AP_{id}$) and the smallest internal dimension ($CEi_d$) of the contact end of the flexible intermediate portion may vary no more than 15% of each other in internal dimension, and preferably may vary no more than 10% of each other in internal dimension. Further, the end-effector system may produce audible noise when the smallest internal dimension of the attachment portion ($AP_{id}$) and the smallest internal dimension ($BI_{id}$) of the bellows insert may vary no more than 15% of each other in dimension, e.g., diameter, and preferably may vary no more than 10% of each other in dimension, e.g., diameter. Again, the use of designs in accordance with an aspect of the invention may reduce the noise generated in a compliant end-effector when used in such a high air-flow application.

Figure 10:
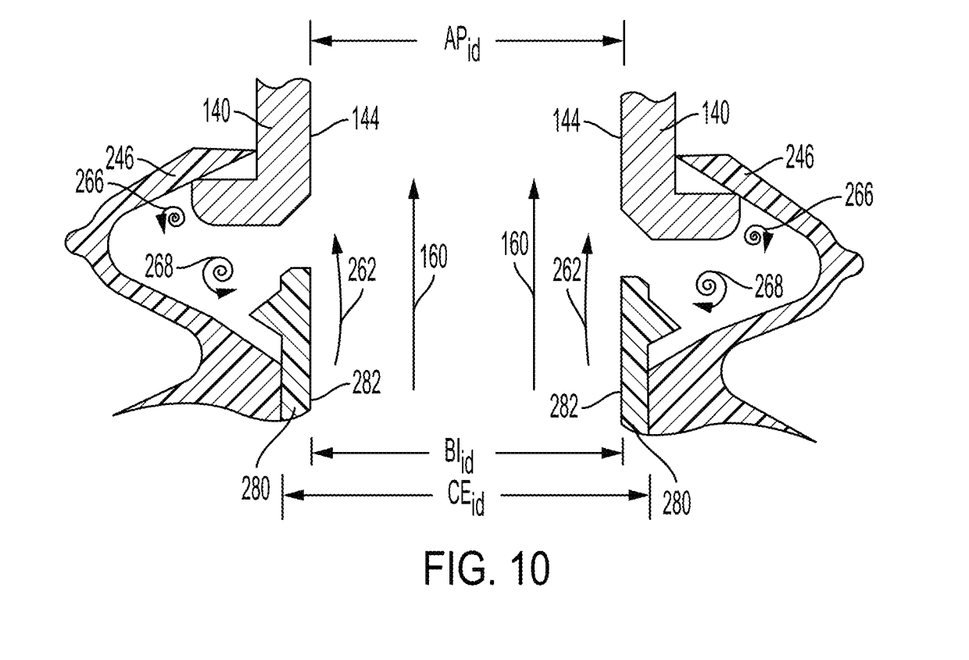
FIG. 10 shows an illustrative diagrammatic center-sectional view similar to that in FIG. 9 of an end-effector in accordance with another aspect of the present invention.

In accordance with further aspects of the invention and with reference to FIG. 10, the contact end of the flexible intermediate portion 246 may be provided that has a smallest internal dimension ($CE_{id}$) that is larger than the internal dimension of the attachment portion ($AP_{id}$) such that the smallest internal dimension ($BI_{id}$) of the bellows insert is aligned or nearly aligned with the smallest internal dimension of the attachment portion ($AP_{id}$) (resulting in a whistle absent a bellows insert in accordance with an aspect of the invention). Again, the smallest internal dimension of the attachment portion ($AP_{id}$) and the smallest internal dimension ($CE_{id}$) of the contact end of the flexible intermediate portion may vary no more than 15% of each other in dimension (e.g., diameter), and preferably may vary no more than 10% of each other in dimension (e.g., diameter). Further, the smallest internal dimension of the attachment portion ($AP_{id}$) and the smallest internal dimension ($BI_{id}$) of the bellows insert may vary no more than 15% of each other in dimension (e.g., diameter), and preferably may vary no more than 10% of each other in dimension (e.g., diameter). While some air within the bellows may develop small vortexes (shown diagrammatically at 266, 268), any movement of air will generally be non-uniform. Most significantly, the rate of movement of air within the bellows will be greatly reduced, and large oscillations of air will be reduced or eliminated, resulting in a substantial decrease in unwanted noise during high flow vacuum use as discussed above.

Figure 11:
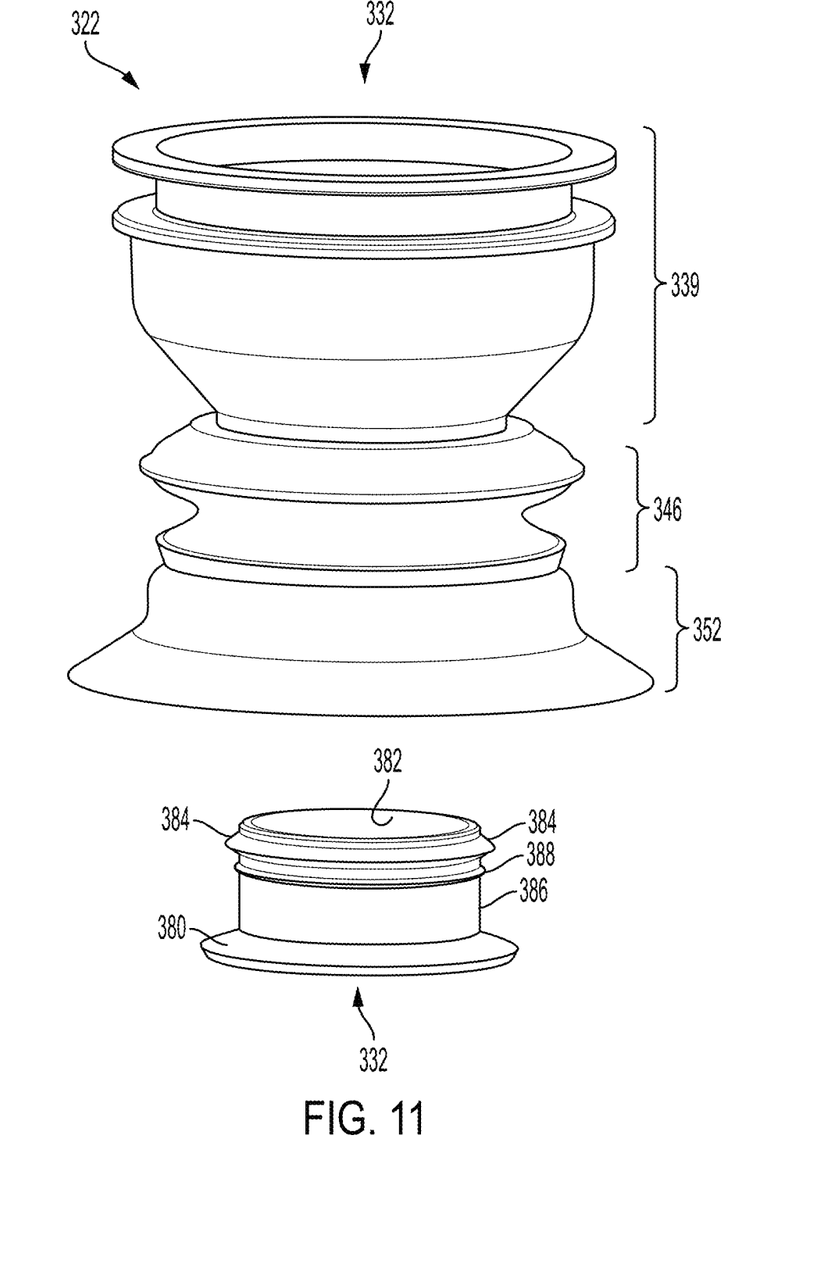
FIG. 11 shows an illustrative diagrammatic exploded view of an end-effector in accordance with a further aspect of the invention that includes a bellows insert that includes a plurality of position securement features.
Figure 12:
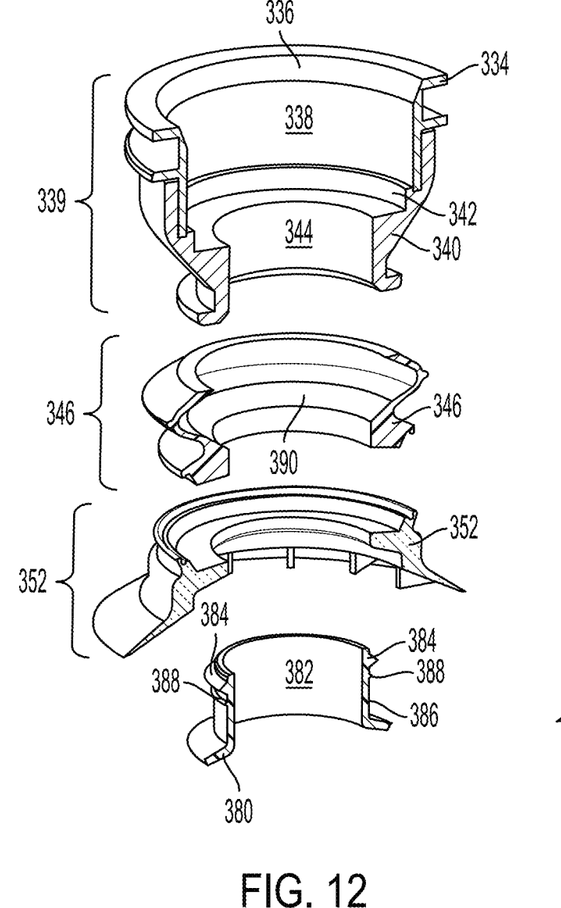
FIG. 12 shows an illustrative diagrammatic exploded partial section view of the end-effector of FIG. 11.
Figure 13:
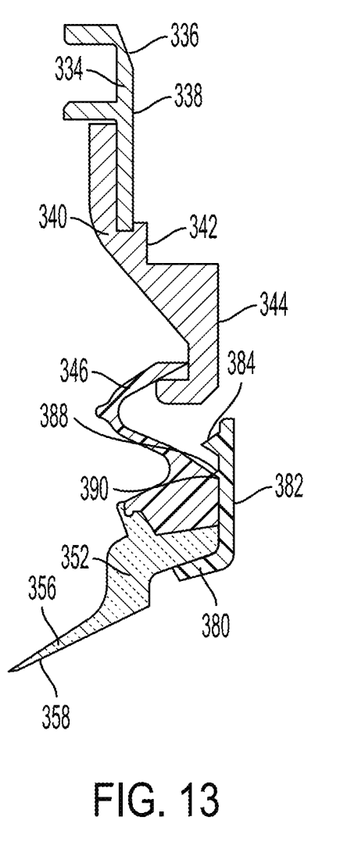
FIG. 13 shows an illustrative diagrammatic partial side sectional view of the end-effector of FIG. 11.

In accordance with a further embodiment, the invention provides an end-effector 322 and a programmable motion device 10 (of FIG. 1) including the end-effector 322 (of FIGS. 11-13). The end-effector 322 provides a vacuum channel 332 that is provided, in part, by an attachment section 339 that includes an attachment unit 334 having inner dimension portions 336 and 338, and a collar 340 having inner dimension portions 342 and 344. The end-effector 322 also includes a flexible intermediate portion 346 including a bellows having varying inner dimension portions 348, and a contact section 356 including a vacuum cup. The end-effector 322 further includes a bellows insert 380 having an inner dimension 382. The bellows insert 380 includes a head portion 384 (optionally to facilitate retention) on a protruding end of the bellows insert that extends into the bellows on a bellow insert extension 386, yet does not negatively affect substantial movement of the flexible intermediate portion 346. Additionally, the bellows insert includes a shoulder engagement feature 388 that is secured against a shoulder 390 of the flexible intermediate portion 346 as discussed below with reference to FIGS. 12 and 13.

FIG. 12 shows an exploded view of the combined attachment unit 334 and collar 340, the flexible intermediate portion 346 including the vacuum cup 352, and the bellows insert 380. With further reference to FIG. 13, the inner dimension portion 344 of the collar 340, and the inner dimension portion 350 of the flexible intermediate portion 346 may be aligned or closely aligned. Applicants have discovered that in such arrangement, under certain conditions of high flow vacuum use, substantial unwanted noise may result absent a bellows insert 380. The shoulder engagement feature 388 is secured against the shoulder 390 of the flexible intermediate portion 346. The shoulder 390 and an outer surface of the bellows insert 380 may additionally serve to secure the vacuum cup 352 to the flexible intermediate portion 346.

Those skilled in the art will appreciate that numerous modifications and variations may be made to the above disclosed embodiments without departing from the spirit and scope of the present invention.

What is claimed is:

1. An end-effector for a programmable motion device for use with a vacuum source, said end-effector comprising:
    an end-effector attachment portion for attaching the end-effector to the programmable motion device, said end-effector attachment portion including a vacuum channel coupled to the vacuum source;
    a contact portion of the end-effector for contacting an object to be acquired by the contact portion of the end-effector;
    a flexible intermediate section including a contact end proximate the contact portion of the end-effector, said flexible intermediate section of the end-effector being intermediate the end-effector attachment portion and the contact portion of the end-effector, said flexible intermediate section including a bellows portion that extends radially outwardly of the vacuum channel; and
    a bellows insert that extends into the flexible intermediate section to inhibit air-flow from entering the bellows portion, and wherein the bellows insert does not significantly inhibit freedom of movement of the flexible intermediate section, and
    wherein the bellows insert includes a ring-shaped head portion that extends radially outwardly into the bellows portion, and wherein the head portion of the bellows insert includes a top surface and a bottom surface that extend radially outwardly toward each other, merging at the radially outward-most edge of the head portion.

2. The end-effector as claimed in claim 1, wherein said end-effector attachment portion has a smallest internal diameter of $APi_d$, said contact end of the flexible intermediate section has a smallest internal diameter of $CEi_d$; and wherein the values $AP_{id}$ and $CE_{id}$ are within 15% of each other.

3. The end-effector as claimed in claim 2, wherein the values $AP_{id}$ and $CE_{id}$ are within 10% of each other.

4. The end-effector as claimed in claim 1, wherein said end-effector attachment portion has a smallest internal diameter of $APi_d$, said bellows insert has a smallest internal diameter of $BI_{id}$; and wherein the values $AP_{id}$ and $BI_{id}$ are within 15% of each other.

5. The end-effector as claimed in claim 4, wherein the values $AP_{id}$ and $BI_{id}$ are within 10% of each other.

6. The end-effector as claimed in claim 1, wherein said bellows insert includes a shoulder engagement feature that is secured against a shoulder of the flexible intermediate section.

7. The end-effector as claimed in claim 1, wherein the flexible intermediate section is formed of a polymeric material.

8. The end-effector as claimed in claim 1, wherein the contact portion is formed of a flexible polymeric material.

9. A programmable motion device for use with a vacuum source, said programmable motion device including an end-effector comprising:
    an end-effector attachment portion for attaching the end-effector to the programmable motion device, said end-effector attachment portion including a vacuum channel coupled to the vacuum source;
    a contact portion of the end-effector for contacting an object to be acquired by the contact portion of the end-effector;
    a flexible intermediate section including a contact end proximate the contact portion of the end-effector, said flexible intermediate section being intermediate the end-effector attachment portion and the contact portion of the end-effector, said flexible intermediate section including a bellows portion that extends radially outwardly of the vacuum channel; and
    a bellows insert that extends into the flexible intermediate section to inhibit air-flow from entering the bellows portion such that any resonance of moving air within the bellows portion is disturbed, and wherein the bellows insert does not significantly inhibit freedom of movement of the flexible intermediate section, and
    wherein the bellows insert includes a ring-shaped head portion that extends radially outwardly into the bellows portion, and wherein the head portion of the bellows insert includes a top surface and a bottom surface that extend radially outwardly toward each other, merging at the radially outward-most edge of the head portion.

10. The programmable motion device as claimed in claim 9, wherein said end-effector attachment portion has a smallest internal diameter of $APi_d$, said contact end of the flexible intermediate section has a smallest internal diameter of $CEi_d$; and wherein the values $AP_{id}$ and $CE_{id}$ are within 10% of each other.

11. The programmable motion device as claimed in claim 9, wherein said end-effector attachment portion has a smallest internal diameter of $APi_d$, said bellows insert has a smallest internal diameter of $BIi_d$; and wherein the values $AP_{id}$ and $BI_{id}$ are within 10% of each other.

12. The programmable motion device as claimed in claim 9, wherein said bellows insert includes a shoulder engagement feature that is secured against a shoulder of the flexible intermediate section.

13. The programmable motion device as claimed in claim 9, wherein the flexible intermediate section is formed of a polymeric material.

14. The programmable motion device as claimed in claim 9, wherein the contact portion is formed of a flexible polymeric material.

15. The programmable motion device as claimed in claim 9, wherein the vacuum source provides an air-flow rate at the end-effector of at least 100 cubic feet per minute.

16. The programmable motion device as claimed in claim 9, wherein the vacuum source provides a vacuum pressure at the end-effector of no more than 100,000 Pascals below atmospheric.

17. The programmable motion device as claimed in claim 9, wherein the vacuum source provides a vacuum pressure at the end-effector of no more than 65,000 Pascals below atmospheric.

18. A method of operating a programmable motion device with a vacuum source, said method comprising:
   providing an end-effector attachment portion for attaching an end-effector to the programmable motion device, said end-effector attachment portion including a vacuum channel coupled to the vacuum source;
   providing a contact portion of the end-effector for contacting an object to be acquired by the contact portion of the end-effector;
   providing a flexible intermediate section of the end-effector that is intermediate the end-effector attachment portion and the contact portion of the end-effector, said flexible intermediate section including a bellows portion that extends radially outwardly of the vacuum channel; and
   providing a bellows insert that extends into the flexible intermediate section to inhibit air flow from entering the bellows portion such that any resonance of moving air within the bellows portion is disturbed, wherein the bellows insert does not significantly inhibit freedom of movement of the flexible intermediate section, and
   wherein the bellows insert includes a ring-shaped head portion that extends radially outwardly into the bellows portion, and wherein the head portion of the bellows insert includes a top surface and a bottom surface that extend radially outwardly toward each other, merging at the radially outward-most edge of the head portion.

19. The method as claimed in claim 18, wherein said end-effector attachment portion has a smallest internal diameter of $APi_d$, said contact end of the flexible intermediate section has a smallest internal diameter of $CEi_d$; and wherein the values $AP_{id}$ and $CE_{id}$ are within 10% of each other.

20. The method as claimed in claim 18, wherein said end-effector attachment portion has a smallest internal diameter of $APi_d$, said bellows insert has a smallest internal diameter of $BIi_d$; and wherein the values $AP_{id}$ and $BI_{id}$ are within 10% of each other.

21. The method as claimed in claim 18, wherein said bellows insert includes a shoulder engagement feature that is secured against a shoulder of the flexible intermediate section.

22. The method as claimed in claim 18, wherein the vacuum source provides an air-flow rate at the end-effector of at least 100 cubic feet per minute.

23. The method as claimed in claim 18, wherein the vacuum source provides a vacuum pressure at the end-effector of no more than 100,000 Pascals below atmospheric.

24. The method as claimed in claim 18, wherein the vacuum source provides a vacuum pressure at the end-effector of no more than 50,000 Pascals below atmospheric.

25. An end-effector for a programmable motion device for use with a vacuum source, said end-effector comprising:
   an end-effector attachment portion for attaching the end-effector to the programmable motion device, said end-effector attachment portion including a vacuum channel coupled to the vacuum source;
   a contact portion of the end-effector for contacting an object to be acquired by the contact portion of the end-effector;
   a flexible intermediate section including a contact end proximate the contact portion of the end-effector, said flexible intermediate section of the end-effector being intermediate the end-effector attachment portion and the contact portion of the end-effector, said flexible intermediate section including a bellows portion that extends radially outwardly of the vacuum channel; and
   a bellows insert that extends into the flexible intermediate section to inhibit air-flow from entering the bellows portion, wherein the bellows insert does not significantly inhibit freedom of movement of the flexible intermediate section, and wherein said bellows insert includes a shoulder engagement feature that is secured against a shoulder of the flexible intermediate section.

26. The end-effector as claimed in claim 25, wherein said end-effector attachment portion has a smallest internal diameter of $APi_d$, said contact end of the flexible intermediate section has a smallest internal diameter of $CEi_d$; and wherein the values $AP_{id}$ and $CEi_d$ are within 15% of each other.

27. The end-effector as claimed in claim 26, wherein the values $AP_{id}$ and $CE_{id}$ are within 10% of each other.

28. The end-effector as claimed in claim 25, wherein said end-effector attachment portion has a smallest internal diameter of $APi_d$, said bellows insert has a smallest internal diameter of $BIi_d$; and wherein the values $AP_{id}$ and $BI_{id}$ are within 15% of each other.

29. The end-effector as claimed in claim 28, wherein the values $AP_{id}$ and $BI_{id}$ are within 10% of each other.

30. The end-effector as claimed in claim 25, wherein said bellows insert includes a head portion that extends radially outwardly into the bellows portion.

31. The end-effector as claimed in claim 30, wherein the head portion of the bellows insert is generally ring-shaped and includes a top surface and a bottom surface that extend radially outwardly toward each other, merging at the radially outward-most edge of the head portion.

32. The end-effector as claimed in claim 25, wherein the flexible intermediate section is formed of a polymeric material.

33. The end-effector as claimed in claim 25, wherein the contact portion is formed of a flexible polymeric material.

34. A programmable motion device for use with a vacuum source, said programmable motion device including an end-effector comprising:
- an end-effector attachment portion for attaching the end-effector to the programmable motion device, said end-effector attachment portion including a vacuum channel coupled to the vacuum source;
- a contact portion of the end-effector for contacting an object to be acquired by the contact portion of the end-effector;
- a flexible intermediate section including a contact end proximate the contact portion of the end-effector, said flexible intermediate section being intermediate the end-effector attachment portion and the contact portion of the end-effector, said flexible intermediate section including a bellows portion that extends radially outwardly of the vacuum channel; and
- a bellows insert that extends into the flexible intermediate section to inhibit air-flow from entering the bellows portion such that any resonance of moving air within the bellows portion is disturbed, and wherein the bellows portion does not significantly inhibit freedom of movement of the flexible intermediate section, and wherein said bellows insert includes a shoulder engagement feature that is secured against a shoulder of the flexible intermediate section.

35. The programmable motion device as claimed in claim 34, wherein said end-effector attachment portion has a smallest internal diameter of $APi_d$, said contact end of the flexible intermediate section has a smallest internal diameter of $CEi_d$; and wherein the values $AP_{id}$ and $CE_{id}$ are within 10% of each other.

36. The programmable motion device as claimed in claim 34, wherein said end-effector attachment portion has a smallest internal diameter of $APi_d$, said bellows insert has a smallest internal diameter of $BIi_d$; and wherein the values $AP_{id}$ and $BI_{id}$ are within 10% of each other.

37. The programmable motion device as claimed in claim 34, wherein said bellows insert includes a head portion that extends radially outwardly into the bellows portion.

38. The programmable motion device as claimed in claim 37, wherein the head portion of the bellows insert is generally ring-shaped and includes a top surface and a bottom surface that extend radially outwardly toward each other, merging at the radially outward-most edge of the head portion.

39. The programmable motion device as claimed in claim 34, wherein the flexible intermediate section is formed of a polymeric material.

40. The programmable motion device as claimed in claim 34, wherein the contact portion is formed of a flexible polymeric material.

41. The programmable motion device as claimed in claim 34, wherein the vacuum source provides an air-flow rate at the end-effector of at least 100 cubic feet per minute.

42. The programmable motion device as claimed in claim 34, wherein the vacuum source provides a vacuum pressure at the end-effector of no more than 100,000 Pascals below atmospheric.

43. The programmable motion device as claimed in claim 34, wherein the vacuum source provides a vacuum pressure at the end-effector of no more than 65,000 Pascals below atmospheric.

44. A method of operating a programmable motion device with a vacuum source, said method comprising:
- providing an end-effector attachment portion for attaching an end-effector to the programmable motion device, said end-effector attachment portion including a vacuum channel coupled to the vacuum source;
- providing a contact portion of the end-effector for contacting an object to be acquired by the contact portion of the end-effector;
- providing a flexible intermediate section of the end-effector that is intermediate the end-effector attachment portion and the contact portion of the end-effector, said flexible intermediate section including a bellows portion that extends radially outwardly of the vacuum channel; and
- providing a bellows insert that extends into the flexible intermediate section to inhibit air flow from entering the bellows portion such that any resonance of moving air within the bellows portion is disturbed, wherein the bellows insert does not significantly inhibit freedom of movement of the flexible intermediate section, and wherein said bellows insert includes a shoulder engagement feature that is secured against a shoulder of the flexible intermediate section.

45. The method as claimed in claim 44, wherein said end-effector attachment portion has a smallest internal diameter of $APi_d$, said contact end of the flexible intermediate section has a smallest internal diameter of $CEi_d$; and wherein the values $AP_{id}$ and $CE_{id}$ are within 10% of each other.

46. The method as claimed in claim 44, wherein said end-effector attachment portion has a smallest internal diameter of $APi_d$, said bellows insert has a smallest internal diameter of $BIi_d$; and wherein the values $AP_{id}$ and $BI_{id}$ are within 10% of each other.

47. The method as claimed in claim 44, wherein said bellows insert includes a head portion that extends radially outwardly into the bellows portion.

48. The method as claimed in claim 47, wherein the head portion of the bellows insert is generally ring-shaped and includes a top surface and a bottom surface that extend radially outwardly toward each other, merging at the radially outward-most edge of the head portion.

49. The method as claimed in claim 44, wherein the vacuum source provides an air-flow rate at the end-effector of at least 100 cubic feet per minute.

50. The method as claimed in claim 44, wherein the vacuum source provides a vacuum pressure at the end-effector of no more than 100,000 Pascals below atmospheric.

51. The method as claimed in claim 44, wherein the vacuum source provides a vacuum pressure at the end-effector of no more than 50,000 Pascals below atmospheric.

* * * * *